United States Patent
Furuya et al.

[11] Patent Number: 5,990,644
[45] Date of Patent: Nov. 23, 1999

[54] MOTOR DRIVE CIRCUIT

[75] Inventors: Misao Furuya; Kazuhito Matsuura, both of Atsugi, Japan

[73] Assignee: Mitsumi Electric Co., Ltd., Tokyo, Japan

[21] Appl. No.: 09/246,526

[22] Filed: Feb. 8, 1999

[30] Foreign Application Priority Data

Feb. 19, 1998 [JP] Japan .................................. 10-037723

[51] Int. Cl.$^6$ ...................................................... H02P 1/00
[52] U.S. Cl. .............................. 318/293; 363/98; 363/17; 257/546; 318/294
[58] Field of Search ................................... 318/293, 294; 363/98, 17; 330/288; 257/546

[56] References Cited

U.S. PATENT DOCUMENTS

| | | | |
|---|---|---|---|
| 4,358,724 | 10/1982 | Haner | 318/681 |
| 4,472,642 | 9/1984 | Akamatsu | 307/252 C |
| 4,527,103 | 7/1985 | Kade | 318/293 |
| 4,544,869 | 10/1985 | Pittaway | 318/293 |
| 4,680,513 | 7/1987 | Kennedy | 318/285 |
| 4,899,063 | 2/1990 | Suck | 307/9.1 |

*Primary Examiner*—Paul Ip
*Assistant Examiner*—Rita Leykin
*Attorney, Agent, or Firm*—Ladas & Parry

[57] ABSTRACT

A motor drive circuit 1 is driven by a DC power source 2 connected to power source terminals Tv1, Tv2 and has a first drive transistor Q1 for controlling a drive current supplied to a first terminal Tm1 of a motor from the DC power source 2, a second drive transistor Q2 for supplying current drawn from the first terminal Tm1 of the motor 3 to a ground, a third drive transistor Q3 for controlling a drive current supplied to a second terminal Tm2 of the motor 3 from the DC power source 2, a fourth drive transistor Q4 for drawing current from a second terminal Tm2 of the motor 3, a drive control circuit 4 for controlling the operation of the motor 3 by controlling the drive transistors Q1 through Q4 in response to a first and second control signal supplied to a first and second control terminal Tc1, Tc2, a first control transistor Qc1 having the same polarity as, and connected in parallel to and in the reverse direction of, the second drive transistor Q2 and a second control transistor Qc2 having the same polarity as, and connected in parallel to and in the reverse direction of, the fourth drive transistor Q4. The control transistors limit a decrease in voltage at the first and second terminals Tm1 and Tm2 of the motor 3 generated by a counter-electromotive force of the motor 3, making it possible to clamp the voltage at the terminals at a relatively low level. As a result, a lock-up is prevented even with the use of relatively small-capacity diodes, with the advantage that an IC chip of the motor drive circuit can be reduced further in size.

7 Claims, 11 Drawing Sheets

MOTOR DRIVE CIRCUIT

BACKGROUND OF THE INVENTION

1. Field of the Invention

The present invention relates generally to a motor drive circuit, and more particularly to a motor drive circuit capable of rotatably driving a DC motor in forward and reverse rotation.

2. Description of the Related Art

Figure 9:
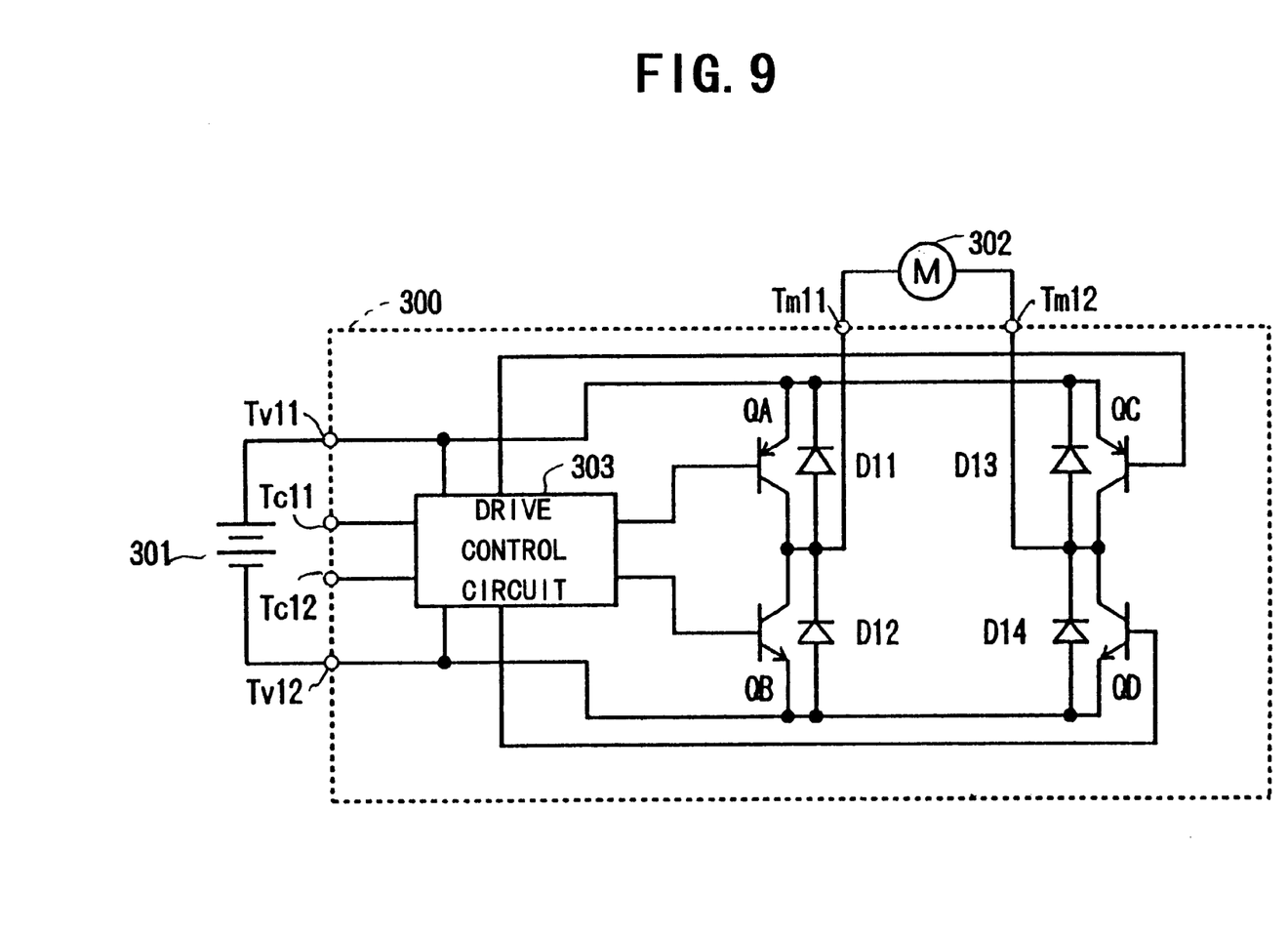
FIG. 9 is a circuit diagram of a conventional motor drive circuit.

FIG. 9 is a diagram of a conventional motor drive circuit. The conventional motor drive circuit 300, which is driven by a DC power source 301 connected to terminals Tv11 and Tv12, comprises a first drive transistor QA for controlling a drive current supplied to a first terminal Tm11 of the motor 302 from the DC power source 301; a second drive transistor QB for drawing current from a first terminal Tm11 of the motor 302 and supplying it to a ground; a third drive transistor QC for controlling a drive current supplied to a second terminal Tm12 of the motor 302 from the DC power source 301; a fourth drive transistor QD for drawing current from the second terminal Tm12 of the motor 302; a drive control circuit 303 for controlling movements of the motor 302 by controlling first, second, third and fourth drive transistors QA, QB, QC and QD in response to a first control signal and a second control signal supplied to a first control terminal Tc11 and a second control terminal Tc12; and diodes D11, D12, D13 and D14 for absorbing a positive deflection from a counter electromotive force generated to the motor 302.

The first drive transistor QA comprises a PNP transistor. An emitter of the PNP transistor is connected to a positive terminal of the DC power source 301 and a collector of the PNP transistor is connected to the first terminal Tm11 of the motor 302. A first drive control signal is supplied to a base of the PNP transistor from the drive control circuit 303. The second drive transistor QB comprises an NPN transistor. An emitter of the NPN transistor is connected to a negative terminal of the DC power source 301 and a collector of the NPN transistor is connected to the first terminal Tm11 of the motor 302. A second drive control signal is supplied to a base of the NPN transistor from the drive control circuit 303.

The third drive transistor QC comprises a PNP transistor. The emitter of the PNP transistor is connected to the positive terminal of the DC power source 301 and the collector of the PNP transistor is connected to the second terminal Tm12 of the motor 302. A third drive control signal is supplied to the base of the PNP transistor from the drive control circuit 303. The fourth drive transistor QB comprises an NPN transistor. The emitter of the NPN transistor is connected to the negative terminal of the DC motor 301 and the collector of the NPN transistor is connected to the second terminal Tm12 of the power source 302. A fourth drive control signal is supplied to the base of the NPN transistor from the drive control circuit 303.

The second drive control signal supplied to the base of the second drive transistor QB is an inversion of the third control signal supplied to the base of the third drive transistor QC. The fourth drive control signal supplied to the base of the fourth drive transistor QD is an inversion of the first control signal supplied to the base of the first drive transistor QA.

The first, second, third and fourth drive control signals are generated in response to the first and second drive signals supplied to the first and second control terminals Tc11 and Tc12 by the drive control circuit.

In the conventional motor drive circuit 300, if for example the first control signal supplied to the first control terminal Tc11 is HIGH and the second control signal supplied to the second control terminal Tc12 is LOW, then the first drive transistor QA and the fourth drive transistor QD are ON and the second drive transistor QB and the third drive transistor QC are OFF, a drive current flows from the first terminal Tm11 to the second terminal Tm12 to the motor 302 and the motor rotates in a forward direction.

Conversely, if the first control signal supplied to the first control terminal Tc11 is LOW and the second control signal supplied to the second control terminal Tc12 is HIGH, then the first drive transistor QA and the fourth drive transistor QD are OFF and the second drive transistor QB and the third drive transistor QC are ON, a drive current flows from the second terminal Tm12 to the first terminal Tm11 to the motor 302 and the motor rotates in a reverse direction.

Additionally, if both the first and second control signals supplied to the first and second control terminals Tc11 and Tc12 are HIGH, then the first and third transistors are OFF and the second and fourth transistors are ON, a brake is applied to the motor 302 and the motor 302 generates a counter-electromotive force from the brake.

Figure 10:
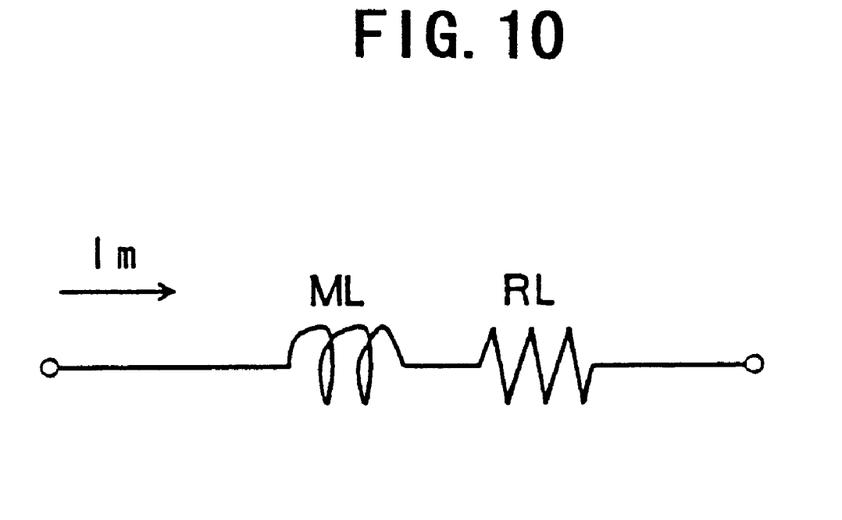
FIG. 10 is a motor equivalent circuit diagram.

FIG. 10 shows an equivalent circuit diagram of a motor. The motor 302 has a built-in coil, and so in general can be expressed as an equivalent circuit connecting in series an inductor $M_L$ and a load resistor $R_L$ as shown in FIG. 10.

Accordingly, when a drive current Im is supplied to the motor 302, a counter-electromotive force is generated by the inductor $M_L$. Specifically, the load of the motor 302 rotates by inertia when the brake is applied, and this rotation of the load generates a reverse voltage which becomes the counter-electromotive force.

If at this point the motor drive circuit is made into an integrated circuit 300, then a negative voltage is generated by the counter-electromotive force arising during this braking at first and second terminals Tm11 and Tm12 connecting the motor 302. The IC forms a plurality of elements including transistors by doping a semiconductor substrate with impurities. Adjacent elements are configured so that a semiconductor layer has a reverse bias polarity. As a result, the motor operates normally with a bias voltage in a predetermined direction.

However, when a negative voltage is generated at first and second terminals Tm11 and Tm12 and a state of the bias of the substrate breaks down, a semiconductor layer between the elements operates as a parasitic element and locks up the device.

As a result, diodes D11, D12, D13 and D14 are provided to absorb the negative voltage generated at both terminals of the motor 302 by operation of the brake.

Specifically, diodes D12 and D14 prevent voltage deflection toward the first and second terminals T11 and T12 during braking and thus prevent the generation of a lock-up state.

If the first and second terminals Tm11 and Tm12 are deflected negatively by the counter-electromotive force arising at the motor 302 when braking the motor 302, then current is supplied from the ground by the diodes D12 and D14 going ON, the negative deflection of the first and second terminals Tm11 and Tm12 of the motor 302 is limited and the generation of a lock-up state caused by the counter-electromotive force is prevented.

Figure 11:
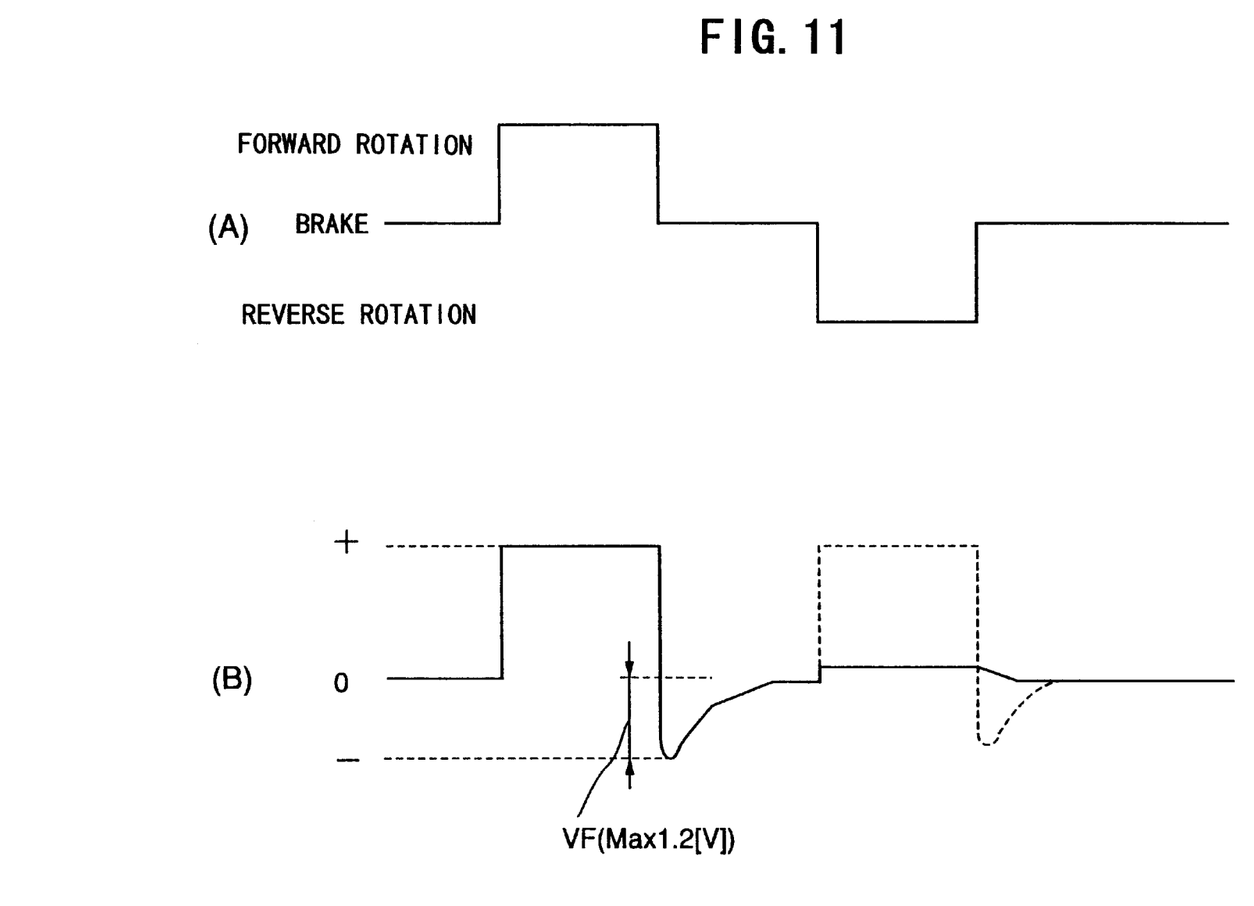
FIGS. 11(A) and 11(B) are diagrams of a wave form of an operation of an essential portion of a conventional motor drive circuit.

FIG. 11 is a diagram of an example of a conventional operating wave form. FIG. 11(A) shows an operating mode of the motor 302 and FIG. 11(B) shows a voltage at a first terminal Tm11 of the motor 302. A negative voltage is generated at the first terminal as shown in FIG. 11(B) when the operating mode of the motor 302 shifts from a state of forward rotation to a state of braking as shown in FIG. 11(A). When negative voltage is generated by the counter-electromotive force of the motor 302, the voltage VF in a forward direction of the diodes D12 and D14 is clamped by diodes D12 and D14 and does not further decline. At this time the voltage VF is clamped by the negative voltage generated by the counter-electromotive force of the motor 302 at a maximum of 1.2 [V].

However, conventional motor drive circuits are configured so that the current generated by the counter-electromotive force is bypassed to the ground by the diodes D12 and D14. Thus a large current flows through these diodes D12 and D14, and it is therefore necessary to make the size of elements such as the diodes D12 and D14 relatively large. As a consequence, when the motor drive circuit is made into an integrated circuit (hereinafter IC chip) the surface area of this IC chip increases.

Additionally, due to variations in the characteristics of the elements during manufacture and assembly it sometimes happens that diodes D12 and D14 alone cannot adequately absorb the negative current created by the counter-electromotive force.

SUMMARY OF THE INVENTION

Accordingly, it is an object of the present invention to provide a motor drive circuit in which the problems described above are eliminated.

The above-described object of the present invention is achieved by a motor drive circuit that can absorb voltage decreases caused by the counter-electromotive force by using elements small in size, the motor drive circuit comprising:

a first drive transistor for controlling an electric current supplied to a first terminal of a motor in response to a control signal;

a second drive transistor for drawing an electric current from the first terminal of said motor in response to said control signal;

a third drive transistor for controlling an electric current supplied to a second terminal of said motor in response to said control signal; and a fourth drive transistor for drawing an electric current from the second terminal of said motor in response to said control signal;

a first control transistor having the same polarity as said second drive transistor and connected in parallel to, and in a reverse direction of, said second drive transistor; and a second control transistor having the same polarity as said fourth drive transistor and connected in parallel to, and in a reverse direction of, said fourth drive transistor.

By providing first and second control transistors having the same polarity as the second and fourth drive transistors and connected in parallel to, and in a reverse direction of, said second and fourth drive transistors as described above, it is possible to limit the decrease in the voltage of the first and second terminals of the motor even when the voltage at the first and second terminals of the motor decreases due to the counter-electromotive force because the first and second drive transistors are driven by reverse β characteristics and an electric current is supplied to the first and second terminals of the motor via the first and second control transistors.

The first and second terminals of the motor can be clamped at a relatively low voltage compared to the diodes and other such elements because the first and second drive transistors are driven by reverse β characteristics. As a result, the generation of a lock-up state can be prevented. As a further result, the surface area of the IC chip can be reduced because the use of large-capacity diodes and other such elements are no longer necessary.

Additionally, the above-described object of the present invention is also achieved by the first control transistor and second control transistor of the motor drive circuit described above, wherein a collector current at a time when a voltage between a collector and an emitter of a transistor is a reverse-direction voltage is less than a collector current at a time when a voltage between said collector and emitter is a forward-direction voltage.

By providing the collector current as described above, it is possible to limit the decrease in voltage of the first and second terminals of the motor and prevent the generation of a lock-up state because the first and second control transistors are ON even if the second and fourth drive transistors are OFF when reverse-direction voltage is generated at the motor and applied to the second and fourth drive transistors and the first and second control transistors. Additionally, the surface area of the IC chip can be reduced, and the drive current is not affected because the first and second control transistors reverse direction and go OFF when a forward-direction voltage is applied to the third and fourth drive transistors.

Further, the above-described object of the present invention is also achieved by the first control transistor and second control transistor described above, wherein a surface area of an element is larger than a length of a circumference of the element.

By providing a surface area of an element larger than a length of a circumference of the element, it is possible to make a reverse-direction characteristic of the collector current smaller than a forward-direction characteristic of the collector current with respect to a voltage between the collector and the emitter of the first and second control transistors. As a result, the motor goes ON and the decrease in the voltage of the first and second terminals of the motor can be limited, the generation of a lock-up state can be prevented and the surface area of the IC chip can be reduced.

Additionally, the above-described object of the present invention is also achieved by the motor drive circuit as described above, the motor drive circuit further comprising:

a first control circuit for controlling a base phase of said fourth drive transistor in response to a base phase of said second drive transistor and said first control transistor; and a second control circuit for controlling a base phase of said second drive transistor in response to a base phase of said fourth drive transistor and said second control transistor.

In the motor drive circuit described above, the first control circuit comprises:

a first detection transistor for drawing an electric current in response to a base phase of said second drive transistor and said first control transistor;

a first control transistor for controlling a base phase of said fourth drive transistor in response to an electric current drawn by said first detection transistor; and a first clamping means for clamping a base phase of said first control transistor in response to an electric current drawn by said first detection transistor, and the second control circuit comprises:

a second detection transistor for drawing an electric current in response to a base phase of said fourth drive transistor and said second control transistor;

a second control transistor for controlling a base phase of said second drive transistor in response to an electric current drawn by said second detection transistor; and a second clamping means for clamping a base phase of said second control transistor in response to an electric current drawn by said second detection transistor.

By providing first and second control circuits as described above, the second and forth drive transistors Q2 and Q4 can be optimally adjusted depending on the state of the first, second, third and fourth drive transistors Q1–Q4, respectively.

Further, the above-described object of the present invention is also achieved by the motor drive circuit as described above, wherein said first and second clamping means comprise resistors.

By providing clamping means comprising resistors, it is possible to achieve a simplified circuit configuration.

Additionally, the above-described object of the present invention is also achieved by the motor drive circuit as described above, wherein said first and second clamping means comprise PN junction elements.

By providing first and second clamping means comprising PN junction elements, it is possible to operate the device with precision at a predetermined point of operation.

Other objects, features and advantages of the present invention will become more apparent from the following detailed description when read in conjunction with the accompanying drawings.

DESCRIPTION OF THE PREFERRED EMBODIMENTS

A detailed description will now be given of an embodiment of a motor drive circuit according to the present invention, with reference to FIG. 1 through FIG. 6.

Figure 1:
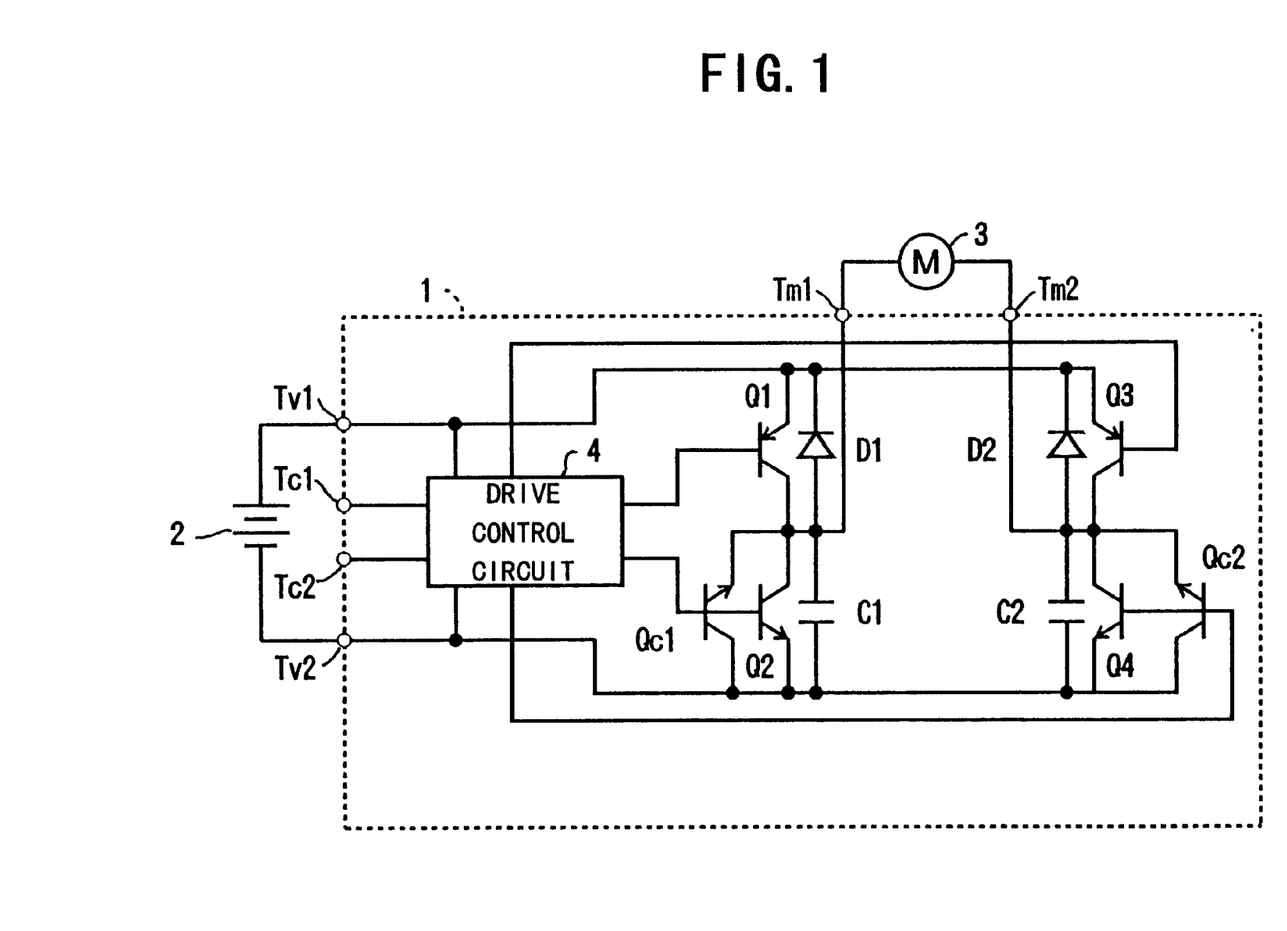
FIG. 1 is a block diagram of a first embodiment of the motor drive circuit according to the present invention.

As shown in FIG. 1, the motor drive circuit of the present embodiment is driven by a DC power source 2 connected to power terminals Tv1 and Tv2, and comprises a first drive transistor Q1 for controlling a drive current supplied to a first terminal Tm1 of the motor 3 from the DC power source 2; a second drive transistor Q2 for drawing current from the first terminal Tm1 of the motor 3 and supplying it to a ground; a third drive transistor Q3 for controlling a drive current supplied to a second terminal Tm2 of the motor 3 from the DC power source 2; a fourth drive transistor Q4 for drawing current from the second terminal Tm2 of the motor 3; a first control transistor Qc1 comprising a transistor having the same polarity as the second drive transistor Q2 and connected in parallel to, and in the reverse direction of, the second drive transistor Q2, a second control transistor Qc2 comprising a transistor having the same polarity as the fourth drive transistor Q2 and connected in parallel to, and in the reverse direction of, the fourth drive transistor Q2; diodes D1 and D2 for absorbing a positive deflection caused by a counter-electromotive force generated at the motor 3; and condensers C1 and C2, and may be formed on an identical semiconductor substrate.

The first drive transistor Q1 comprises a PNP transistor. The emitter of the PNP transistor is connected to the positive terminal of the power source 2 and the collector is connected to the second terminal Tm2 of the motor 3. The base of the PNP transistor is supplied with a third drive control signal from a drive control circuit 4. The fourth drive transistor Q4 comprises an NPN transistor. The emitter of the NPN transistor is connected to the negative terminal of the DC power source 2 and the collector of the NPN transistor is connected to the second terminal Tm2 of the motor 3. The base of the NPN transistor is supplied with a fourth drive control signal from the drive control circuit 4.

Additionally, the first control transistor Qc1 is connected in parallel to the second drive transistor Q2. The first control transistor Qc1 comprises an NPN transistor having the same polarity as the second drive transistor Q2 and is connected in the reverse direction of the second drive transistor Q2. That is, the emitter of the first control transistor Qc1 is connected to the collector of the second drive transistor Q2, the collector of the first control transistor Qc1 is connected to the emitter of the second drive transistor Q2 and the base of the first control transistor Qc1 is connected to the base of the second drive transistor Q2.

Further, the second control transistor Qc2 is connected in parallel to the fourth drive transistor Q4. The second control transistor Qc2 comprises an NPN transistor having the same polarity as the fourth drive transistor Q2 and is connected in the reverse direction of the fourth drive transistor Q2. That is, the emitter of the second control transistor Qc2 is connected to the collector of the fourth drive transistor Q4, the collector of the second control transistor Qc2 is connected to the emitter of the fourth drive transistor Q4 and the base of the second control transistor Qc2 is connected to the base of the fourth drive transistor Q4.

Figure 3:
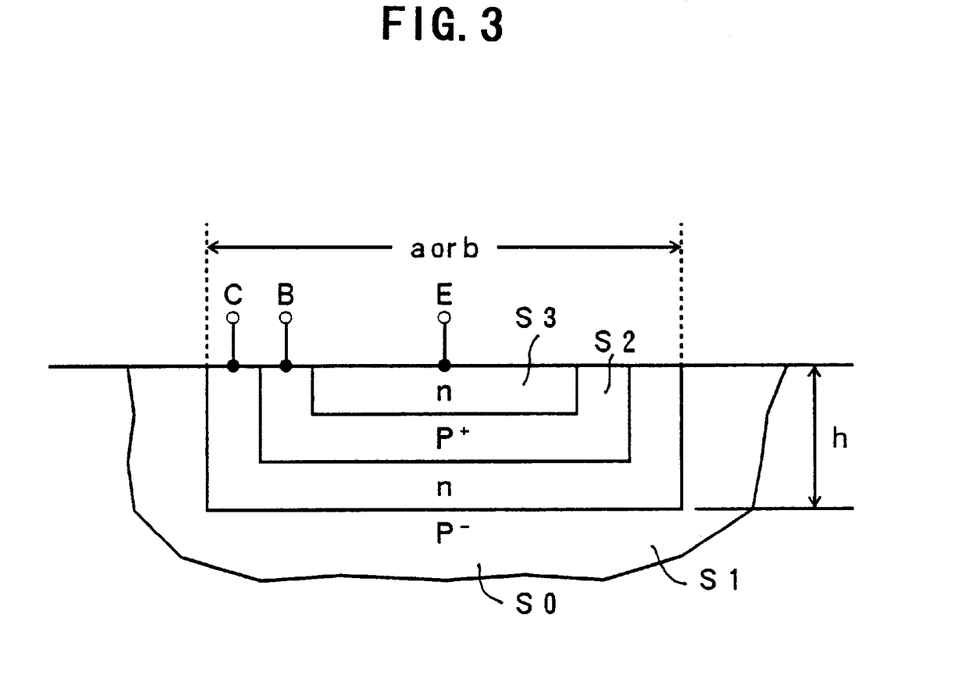
FIG. 3 is a cross-sectional view of first and second control transistors of a first embodiment of the motor drive circuit according to the present invention.
Figure 4:
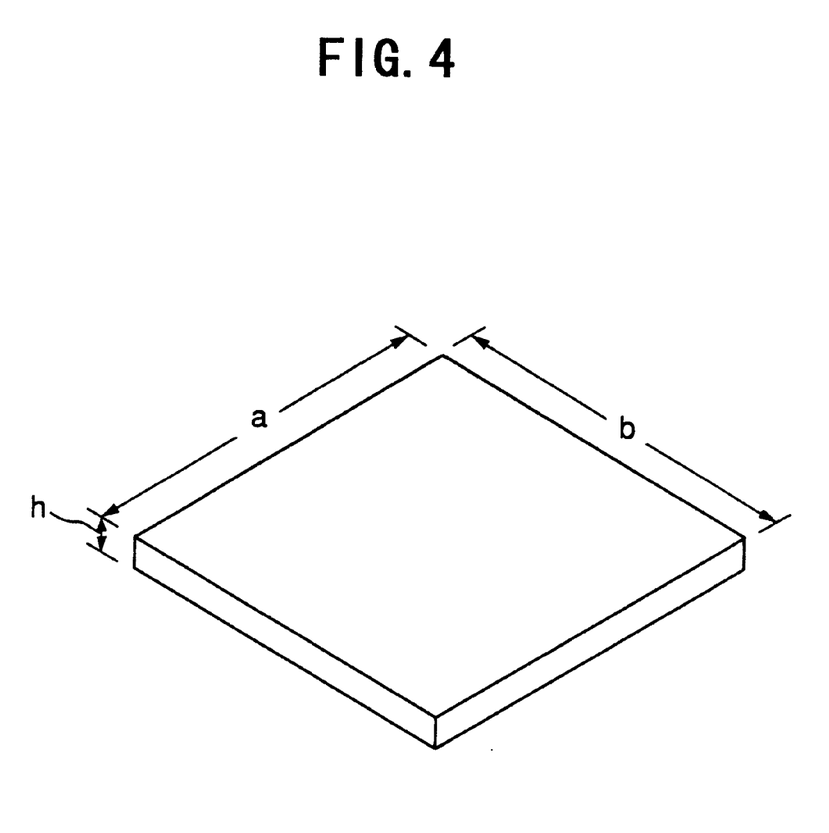
FIG. 4 is a diagram for explaining a shape of elements of first and second control transistors of a first embodiment of the motor drive circuit according to the present invention.

FIG. 3 is a cross-sectional view of first and second control transistors of the present embodiment of the motor drive circuit. FIG. 4 is a diagram for explaining the shape of elements of first and second control transistors of the present embodiment of the motor drive circuit.

As shown for example in FIG. 3, an N-type region S1 is formed on a P-type substrate S0 on which the motor drive circuit 1 is formed. A P-type region S2 is formed within the N-type region S1 and, further, a N-type region S3 is formed within the P-type region S2. The N-type region S1 comprises the collector, the P-type region S2 comprises the base and the N-type region S3 comprises the emitter.

If for example the shape of the elements of the first and second control transistors Qc1 and Qc2 is that shown in FIG. 3 and FIG. 4, in which a and b represent the lengths of the sides of the elements and h represents the thickness of the elements, then the shape of the elements is such that an area of the element (a×b) is much greater than a length of a circumference of the element (a+b+h). That is, $$(a+b+h) << (a \times b) \tag{1}$$

It is known that, in general, with respect to a characteristic of a collector current Ic with respect to a voltage Vce between a collector and an emitter, by providing a shape of the element as given in the above formula (1), a reverse-direction current Ic is clamped at a value that is small in comparison to a forward-direction current Ic.

Figure 5:
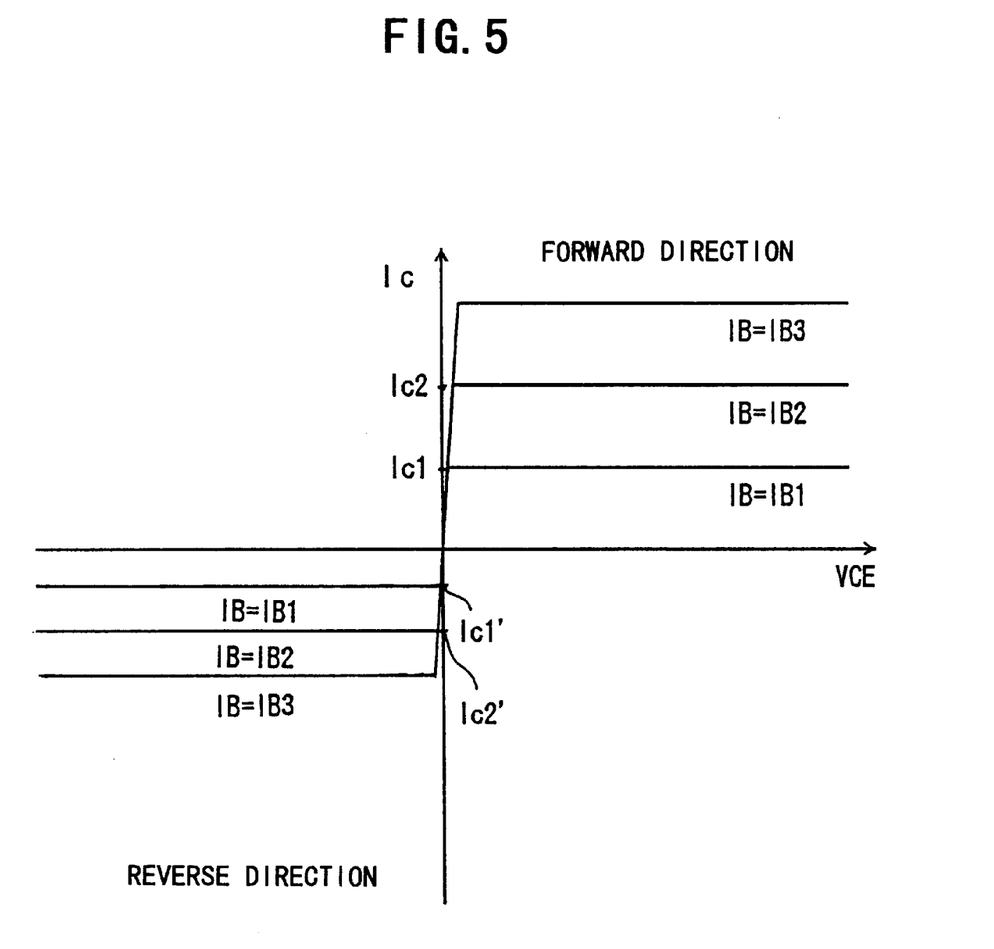
FIG. 5 is a characteristic diagram of a collector current with respect to a voltage between collector and emitter of first and second control transistors of a first embodiment of the motor drive circuit according to the present invention.
Figure 6:
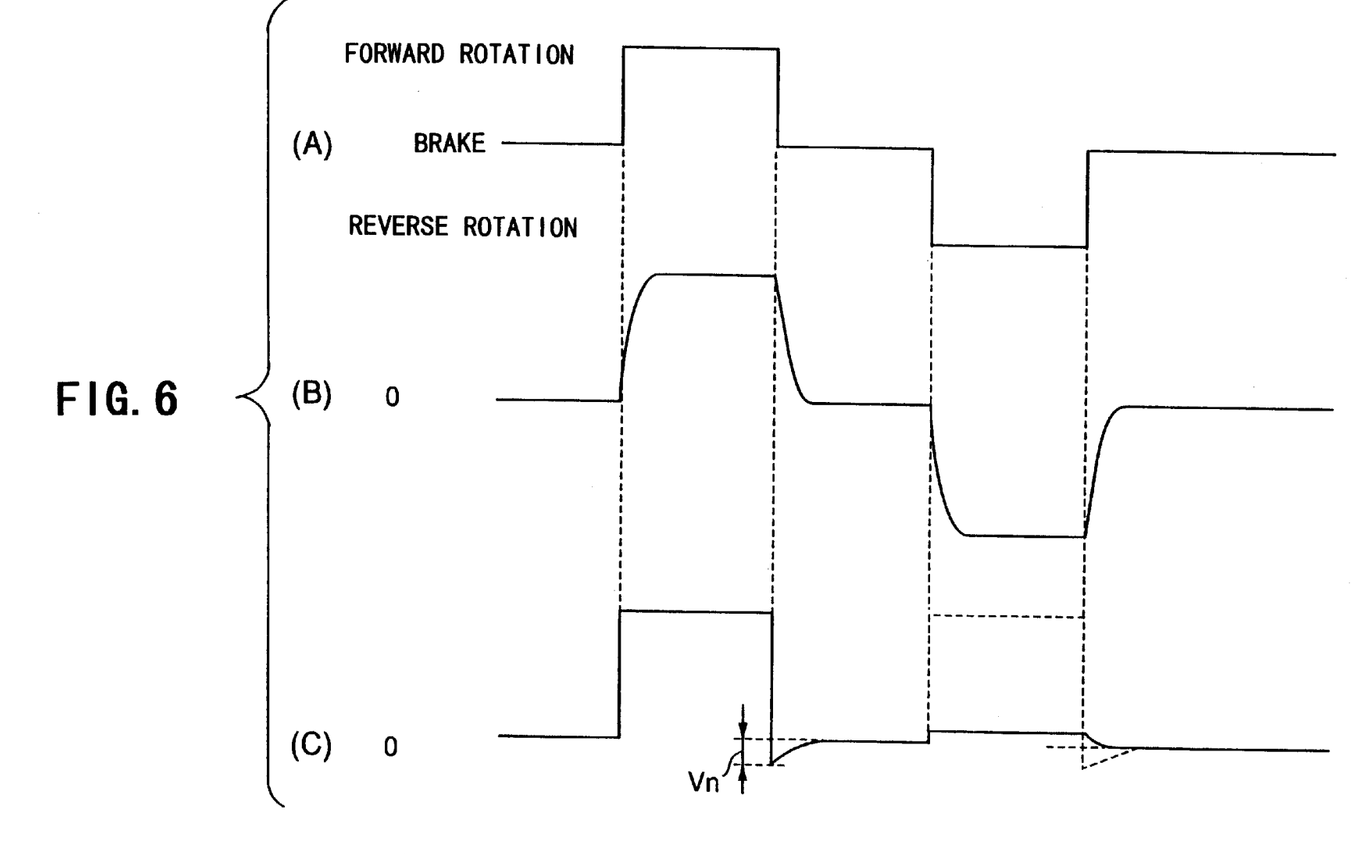
FIGS. 6(A), 6(B) and 6(C) are diagrams of a wave form of an operation of an essential portion of a first embodiment of the motor drive circuit according to the present invention.

FIG. 5 is a characteristic diagram of a collector current with respect to a voltage between collector and emitter of first and second control transistors of the present embodiment of the motor drive circuit.

As shown in FIG. 5, first and second control transistors Qc1 and Qc2 shaped in accordance with the above formula (1), at a time of base current IB1, in contrast to the collector current Ic1 flow in the forward direction, at a time of saturation only a collector current Ic1' (<Ic1) flows in the reverse direction. Additionally, at a time of base current IB2, in contrast to the collector current Ic2 flow in the forward direction, at a time of saturation only a collector current Ic2' (<Ic2) flows in the reverse direction.

As a result, the first and second control transistors Qc1 and Qc2 are effectively operated only when current flows in the forward direction. The first and second control transistors Qc1 and Qc2, and the second and fourth drive transistors Q2 and Q4, are connected in the reverse direction of each other, so when the second and fourth drive transistors Q2 and Q4 are ON the first and second control transistors Qc1 and Qc2 reverse and do not operate effectively.

Additionally, when the second and fourth drive transistors Q2 and Q4 are OFF and a voltage is applied between the collector and the emitter in the forward direction, that is, when a negative voltage is generated at the first and second terminals Tm11 and Tm12 of the motor 3, the first and second control transistors Qc1 and Qc2 operate effectively and the negative voltage generated at the first and second terminals Tm11 and Tm12 of the motor 3 can be clamped at a predetermined voltage, for example approximately 0.3 [V].

It should be noted that the second drive control signal supplied to the base of the second drive transistor Q2 and the first control transistor Qc1 is an inversion of the third control signal supplied to the base of the third drive transistor Q3. Additionally, the fourth drive control signal supplied to the base of the fourth drive transistor Q4 and the second control transistor Qc2 is an inversion of the first control signal supplied to the base of the first drive transistor Q1.

Figure 2:
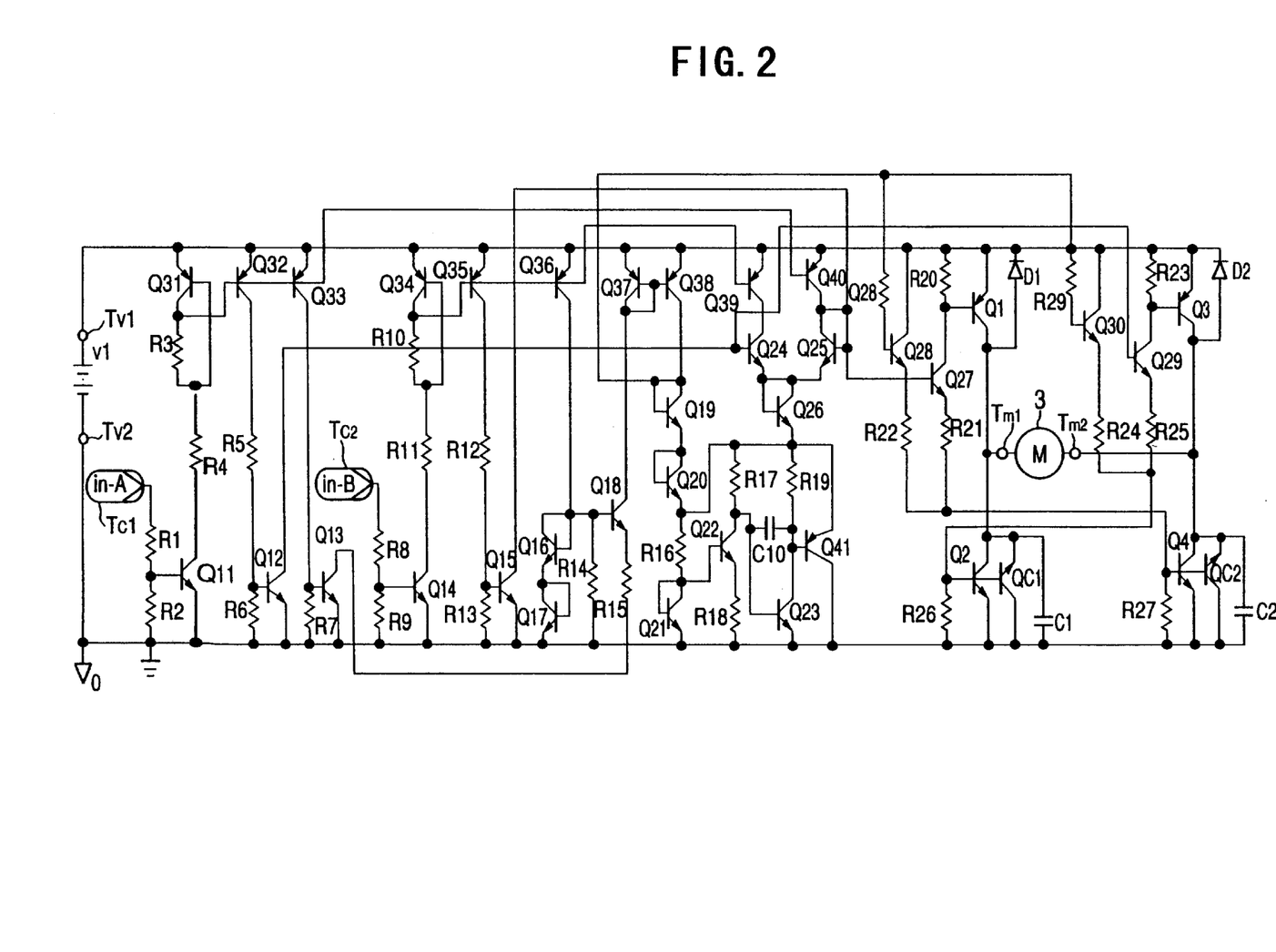
FIG. 2 is a circuit diagram of a first embodiment of the motor drive circuit according to the present invention.

The first, second, third and fourth drive control signals generated by the drive control circuit 4 are generated in response to the first and second control signals supplied to the first and second control terminals Tc1 and Tc2. As shown in FIG. 2, the drive control circuit 4 comprises NPN transistors Q11 through Q30, PNP transistors Q31 through Q41, resistors R1 through R29 and a condenser C10.

A detailed description will now be given of the drive control circuit 4.

FIG. 6(A), FIG. 6(B) and FIG. 6(C) are diagrams of a wave form of an operation of an essential portion of the present embodiment of the motor drive circuit. FIG. 6(A) shows an operating mode of the motor 3, FIG. 6(B) shows a current flowing to the motor 3 and FIG. 6(C) shows a wave form of a voltage of both terminals of the motor.

When the motor is operated so as to rotate forward as shown in FIG. 6(A), the first control terminal Tc1 of the drive control circuit 4 is HIGH and the second control terminal Tc2 of the drive control circuit 4 is LOW. When the first control terminal Tc1 of the drive control circuit 4 is HIGH and the second control terminal Tc2 of the drive control circuit 4 is LOW, transistor Q11 is ON and transistor Q14 is OFF. When transistor Q11 is ON then transistor Q13 is ON as well, turning ON transistors Q32, Q33 and Q40. When transistors Q32 and Q33 are ON, transistors Q12 and Q13 are ON as well.

At the same time, because transistor Q14 is OFF transistor Q34 is OFF as well, turning OFF transistors Q35, Q36 and Q39. When transistors Q35 and Q36 are OFF, transistors Q15 and Q18 are OFF as well.

Additionally, when transistor Q12 is ON transistor Q24 is OFF. At this time the base phase of transistor Q29 is LOW and transistor Q29 is OFF. When transistor Q29 is OFF, the base phase of the third drive transistor Q3, that is, the third drive control signal, is HIGH, and the third drive transistor Q3 is OFF. Additionally, when transistor Q29 is OFF, the base phase of the second drive transistor Q2, that is, the second drive control signal, is LOW, and the second drive transistor Q2 is also OFF.

Further, when transistor Q18 is turned OFF transistors Q37 and Q38 are OFF. When transistors Q37 and Q38 are OFF, transistor Q19 is OFF and transistor Q22, Q23 and Q41 are OFF. At this time, because transistor Q40 is ON and transistor Q15 is OFF the transistor Q40 collector current is supplied to the transistor Q27 base. As a result, the transistor Q27 is ON.

When transistor Q27 is ON, the base phase of the first drive transistor Q1, that is, the first drive control signal, is LOW, and the first drive transistor Q1 is ON. Additionally, when transistor Q27 is turned on, the base phase of the fourth drive transistor Q4, that is, the fourth drive control signal, is HIGH, and the fourth drive transistor Q4 is ON.

Thus, by supplying a first control signal that is HIGH to the first control terminal Tc1 and by supplying a second control signal that is LOW to the second control terminal Tc2, the first drive transistor Q1 is ON, the second drive transistor Q2 is OFF, the third drive transistor Q3 is OFF and the fourth drive transistor Q4 is ON, thus connecting the first terminal Tm1 of the motor 3 to the positive electrode of the DC power source 2 and connecting the second terminal Tm2 of the motor 3 to the negative electrode of the DC power source 2. Accordingly, an electrical current flows from the first terminal Tm1 to the second terminal Tm2 and the motor rotates forward.

It should be noted that, at this time, the first control transistor Qc1 goes OFF because the base of the second drive transistor Q2 enters the OFF phase. Additionally, although the fourth drive transistor Q4 goes ON the second control transistor Qc2 goes OFF without operating effectively due to the reverse β characteristic because the second control transistor Qc2 is connected in the reverse direction of the fourth drive transistor Q4.

When the first control terminal Tc1 is HIGH and the second control terminal Tc2 changes from LOW to HIGH, a brake is applied to the motor 3.

When the second control terminal Tc2 changes from LOW to HIGH, the transistor Q14 goes ON. When transistor Q14 is ON, transistor Q34 is ON as well, turning ON transistors Q35, Q36 and Q39. When transistor Q35 and Q36 are ON, transistors Q15 and Q18 are ON.

When transistor Q15 is ON, transistor Q27 is OFF. When transistor Q27 is OFF, the base phase of the first drive transistor Q1, that is, the first drive control signal, is HIGH, and the first drive transistor Q1 is OFF. Additionally, when transistor Q27 is OFF, the base phase of the fourth drive transistor Q4, that is, the fourth drive control signal, is LOW, and the fourth drive transistor Q4 is also OFF. Accordingly, the first terminal Tm1 of the motor 3 is cut off from the DC power source 2.

It should be noted that, at this time, the third drive transistor Q3 and the second drive transistor Q2 remain OFF, so both the first terminal Tm1 and the second terminal Tm2 of the motor 3 are cut off from the DC power source 2 and a brake is applied to the motor 3.

It should be noted that through inertia the motor continues to rotate even after both the first terminal Tm1 and the second terminal Tm2 of the motor 3 are cut off from the DC power source 2, generating a counter-electromotive force that in turn generates a negative polarity voltage at the first terminal Tm1 of the motor 3. When a negative polarity voltage is generated at the first terminal Tm1 the collector-emitter gap of the second drive transistor Q2 is reversed and does not operate effectively while the collector-emitter gap of the first control transistor Qc1 is put in the forward direction so as to operate effectively. Current is drawn from the collector, that is, from the ground, to the first terminal Tm1, and the phase of the first terminal Tm1 is clamped at a predetermined phase voltage Vn as shown in FIG. 6(C), for example approximately 0.3 V. Accordingly, abnormal operation such as a lock-up can be suppressed.

When the first control signal supplied to the first control terminal Tc1 is changed from HIGH to LOW, the motor 3 rotates in reverse. When the first control signal supplied to the first control terminal Tc1 changes from HIGH to LOW the transistor Q11 goes OFF. When transistor Q11 is OFF, transistors Q31, Q32 and Q40 are OFF. When transistor Q32 is OFF, transistor Q12 is OFF. When transistor Q12 is OFF, transistor Q24 is ON. Additionally, at this time transistor Q18 is ON, so transistors Q22, Q23 and Q41 are ON as well, the transistor Q29 base phase is HIGH and transistor Q29 is ON. When transistor Q29 is ON the base phase of the third drive transistor Q3, that is, the third drive control signal, is LOW, so the third drive transistor Q3 is ON. When the third drive transistor Q3 is ON, an electrical current flows from the DC power source 2 to the second terminal Tm2 of the motor 3.

Additionally, when transistor Q29 is ON, the base phase of the second drive transistor Q2, that is, the second drive control signal, goes HIGH, and the second drive transistor Q2 is ON.

At this time, the first drive transistor Q1 and the fourth drive transistor Q4 remain OFF, so an electrical current flows from the second terminal Tm2 of the motor 3 to the first terminal Tm1 of the motor 3 and the motor rotates in reverse.

It should be noted at this time that the second control transistor Qc2 goes OFF because the base of the fourth drive transistor Q4 is in the OFF phase. Additionally, although the second drive transistor Q4 goes ON the first control transistor Qc1 goes OFF without operating effectively due to the reverse β characteristic because the first control transistor Qc1 is connected in the reverse direction of the second drive transistor Q2.

When the second control terminal Tc2 goes HIGH and the first control terminal Tc1 changes from LOW to HIGH, a brake is applied to the motor 3.

Accordingly, when the first control terminal Tc1 changes from LOW to HIGH, the first drive transistor Q1 and the fourth drive transistor Q4 go OFF as well. Accordingly, the first terminal Tm1 of the motor 3 is cut off from the DC power source 2.

It should be noted that, at this time, the third drive transistor Q3 and the second drive transistor Q2 remain OFF, so both the first terminal Tm1 and the second terminal Tm2 of the motor 3 are cut off from the DC power source 2 and a brake is applied to the motor 3.

It should be noted that through inertia the motor continues to rotate even after both the first terminal Tm1 and the second terminal Tm2 of the motor 3 are cut off from the DC power source 2, generating a counter-electromotive force that in turn generates a negative polarity voltage at the second terminal Tm2 of the motor 3. When a negative polarity voltage is generated at the second terminal Tm2 the collector-emitter gap of the fourth drive transistor Q4 is reversed and does not operate effectively while the collector-emitter gap of the second control transistor Qc2 is put in the forward direction so as to operate effectively. Current is drawn from the collector, that is, from the ground, to the second terminal Tm2, and the phase of the second terminal Tm2 is clamped at a predetermined low phase, for example approximately 0.3 [V]. Accordingly, an abnormal operation such as a lock-up can be suppressed.

According to the embodiment described above, a decrease in the voltage at the first and second terminals Tm1 and Tm2 of the motor 3 can be prevented even when the negative polarity voltage at the first and second terminals connecting the motor declines due to the counter-electromotive force generated at the motor when the motor brake is operated, because the negative polarity voltage of the first and second terminals Tm1 and Tm2 is absorbed by the effective operation of the first and second control transistors Qc1 and Qc2 connected in the forward direction.

Accordingly, it is possible to prevent the generation of a lock-up state when making the motor drive circuit 1 into an IC.

A detailed description will now be given of a second embodiment of a motor drive circuit according to the present invention, with reference to FIG. 7.

Figure 7:
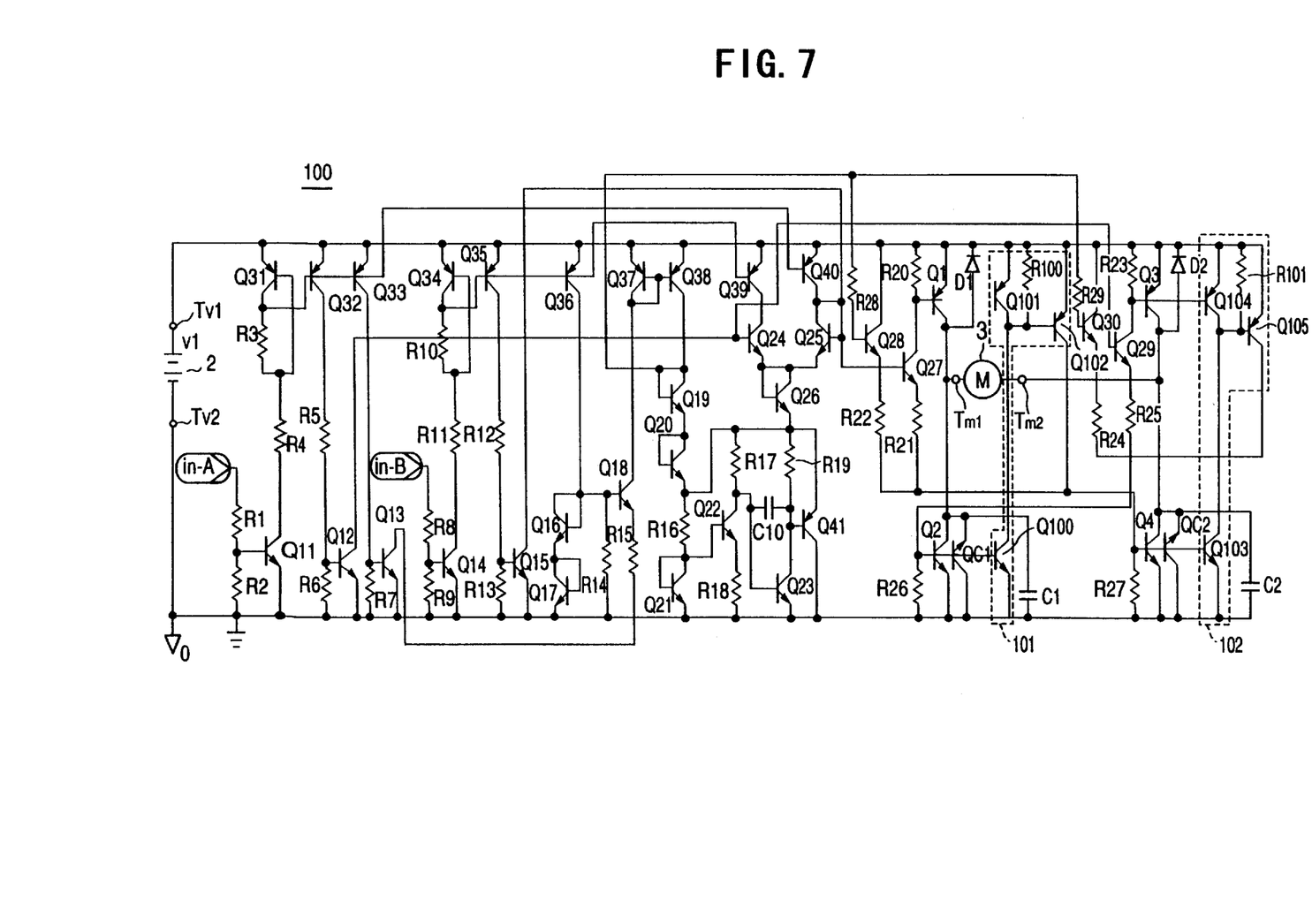
FIG. 7 is a circuit diagram of a second embodiment of the motor drive circuit according to the present invention.

FIG. 7 shows a circuit diagram of a second embodiment of the motor drive circuit according to the present invention. Portions identical to portions shown in FIG. 2 are identically labeled and a description thereof is omitted.

The motor drive circuit 100 of this second embodiment has a control circuit 101 for optimally adjusting the base phase of the fourth drive transistor Q4 in response to the base phases of first and second drive transistors Q1 and Q2, and a second control circuit 102 for optimally adjusting the base phase of the second drive transistor Q2 in response to the base phases of third and fourth drive transistors Q3 and Q4.

The first control circuit 101 comprises an NPN transistor Q100, in which the collector current is adjusted in response to the base phase of the second drive transistor Q2; a PNP transistor Q101, in which the collector current is adjusted in response to the base phase of the first drive transistor Q1; a PNP transistor Q02, in which the collector current is adjusted in response to the sum of the collector currents of the NPN transistor Q100 and the PNP transistor Q101; and a pull-up resistor R100.

Additionally, the second control circuit 102 comprises an NPN transistor Q103, in which the collector current is adjusted in response to the base phase of the fourth drive transistor Q4; a PNP transistor Q104, in which the collector current is adjusted in response to the base phase of the third drive transistor Q3; a PNP transistor Q105, in which the collector current is adjusted in response to the sum of the collector currents of the NPN transistor Q103 and the PNP transistor Q104; and a pull-up resistor R101.

As can be readily appreciated from the above description, the present embodiment makes it possible to optimally adjust the state of the second and fourth drive transistors Q2 and Q4 in response to the state of the first, second, third and fourth drive transistors Q1, Q2, Q3 and Q4.

A detailed description will now be given of a third embodiment of a motor drive circuit according to the present invention, with reference to FIG. 8.

Figure 8:
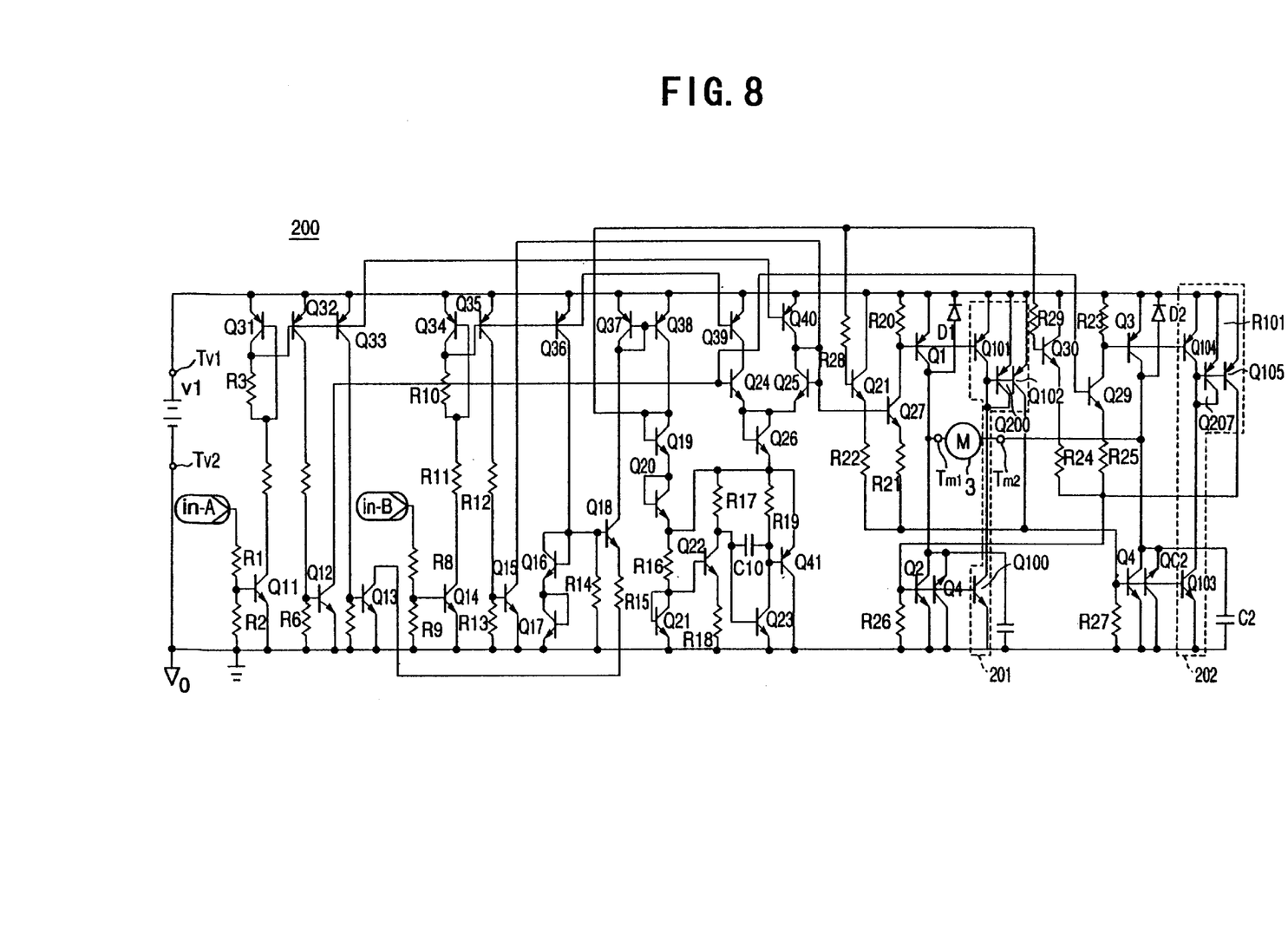
FIG. 8 is a circuit diagram of a third embodiment of the motor drive circuit according to the present invention.

FIG. 8 shows a circuit diagram of a third embodiment of the motor drive circuit according to the present invention. Portions identical to portions shown in FIG. 7 are identically labeled and a description thereof is omitted.

The motor drive circuit 200 of this third embodiment has first and second control circuits having a different configuration from that of first and second control circuits 101 and 102 of the second embodiment of the present invention. In place of the pull-up resistors R100 and R101 of the second embodiment, the first and second control circuits 201 and 202 of this third embodiment use a constant-voltage element comprising PNP transistors Q200 and Q201.

As can be readily appreciated from the above description, the present embodiment makes it possible to adjust the state of the second and fourth drive transistors Q2 and Q4 more precisely than is possible with the second embodiment.

As can be readily appreciated, the present invention is not limited to the circuit configurations described above in the embodiments but may comprise any configuration capable of preventing an abnormal operation such as a lock-up by absorbing the negative voltage generated at both terminals of the motor 3 by using transistors of the same polarity as the second and fourth drive transistors Q2 and Q4, and connected in parallel to, and in the reverse direction of, said second and fourth drive transistors Q2 and Q4.

The above description is provided in order to enable any person skilled in the art to make and use the invention and sets forth the best mode contemplated by the inventors of carrying out their invention. The present invention is not limited to the specifically disclosed embodiments and variations, and modifications may be made without departing from the scope of the present invention.

The present application is based on Japanese priority application No.10-61613 filed on Mar. 12, 1998, the entire contents of which are hereby incorporated by reference.

What is claimed is:

1. A motor drive circuit comprising:
   a first drive transistor for controlling an electric current supplied to a first terminal of a motor in response to a control signal;
   a second drive transistor for drawing an electric current from the first terminal of said motor in response to said control signal;
   a third drive transistor for controlling an electric current supplied to a second terminal of said motor in response to said control signal; and
   a fourth drive transistor for drawing an electric current from the second terminal of said motor in response to said control signal;
   a first control transistor having the same polarity as said second drive transistor and connected in parallel to, and in a reverse direction of, said second drive transistor; and
   a second control transistor having the same polarity as said fourth drive transistor and connected in parallel to, and in a reverse direction of, said fourth drive transistor.

2. The first control transistor and second control transistor as claimed in claim 1, wherein a collector current at a time when a voltage between a collector and emitter is a reverse-direction voltage is less than a collector current at a time when a voltage between said collector and emitter is a forward-direction voltage.

3. The first control transistor and second control transistor as claimed in claim 1, wherein a surface area of an element is larger than a length of a circumference of said element.

4. The motor drive circuit as claimed in claim 1, said motor drive circuit further comprising:
   a first control circuit for controlling a base phase of said fourth drive transistor in response to a base phase of said second drive transistor and said first control transistor; and
   a second control circuit for controlling a base phase of said second drive transistor in response to a base phase of said fourth drive transistor and said second control transistor.

5. The motor drive circuit as claimed in claim 4, the first control circuit comprising:
   a first detection transistor for drawing an electric current in response to a base phase of said second drive transistor and said first control transistor;
   a first control transistor for controlling a base phase of said fourth drive transistor in response to an electric current drawn by said first detection transistor; and
   a first clamping means for clamping a base phase of said first control transistor in response to an electric current drawn by said first detection transistor,
   the second control circuit comprising:
   a second detection transistor for drawing an electric current in response to a base phase of said fourth drive transistor and said second control transistor;
   a second control transistor for controlling a base phase of said second drive transistor in response to an electric current drawn by said second detection transistor; and
   a second clamping means for clamping a base phase of said second control transistor in response to an electric current drawn by said second detection transistor.

6. The motor drive circuit as claimed in claim 5, wherein said first and second clamping means comprise resistors.

7. The motor drive circuit as claimed in claim 5, wherein said first and second clamping means comprise PN junction elements.

* * * * *